Oct. 26, 1954  K. FREY  2,692,708
CARTON METERING INSERT FOR GRANULAR MATERIALS
Filed July 12, 1949  3 Sheets-Sheet 1
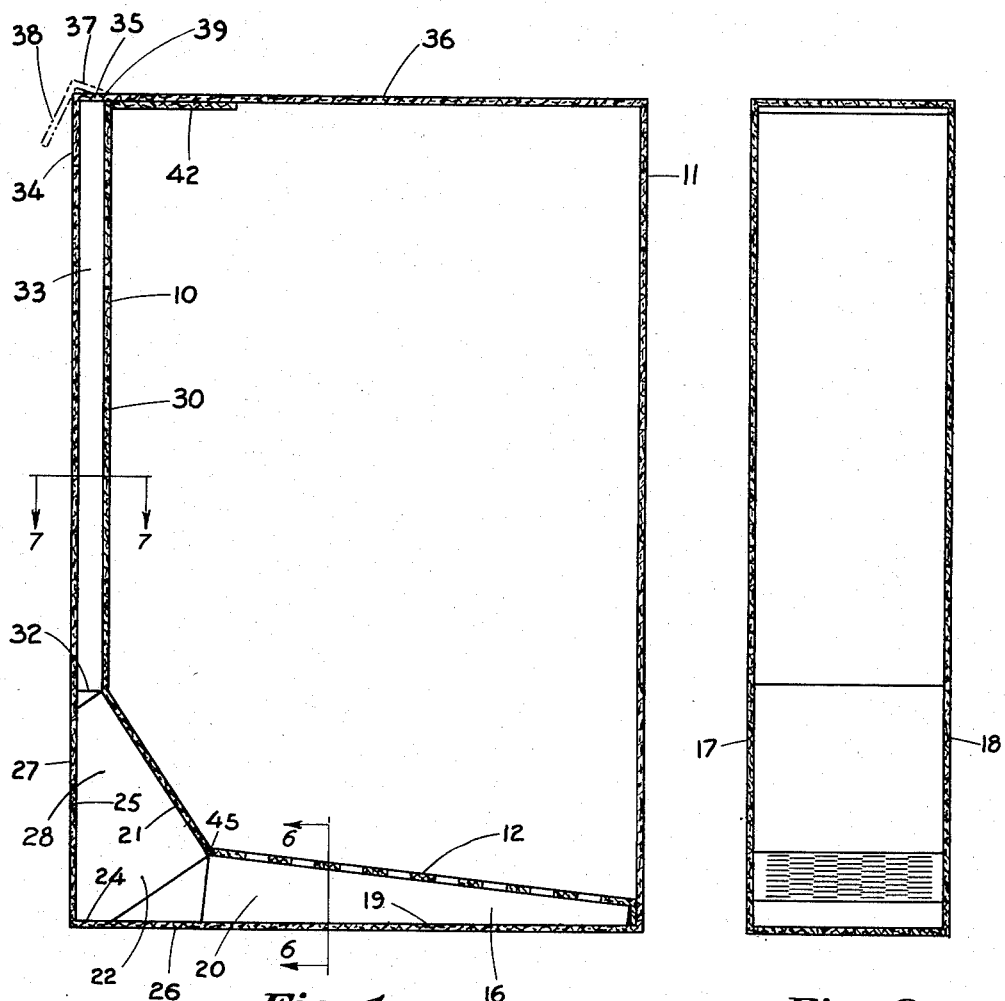
Fig. 1
Fig. 2
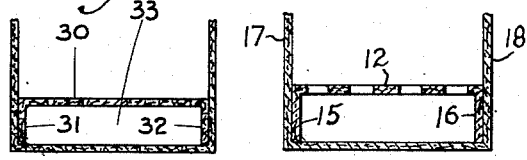
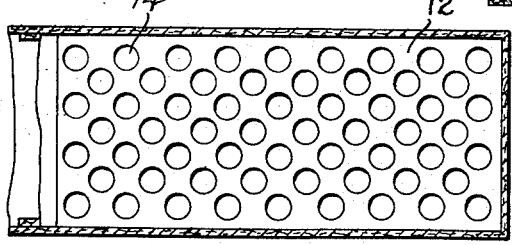
Fig. 3
INVENTOR.
KENNETH FREY
BY
ATTORNEY Oct. 26, 1954  K. FREY  2,692,708
CARTON METERING INSERT FOR GRANULAR MATERIALS
Filed July 12, 1949  3 Sheets-Sheet 2
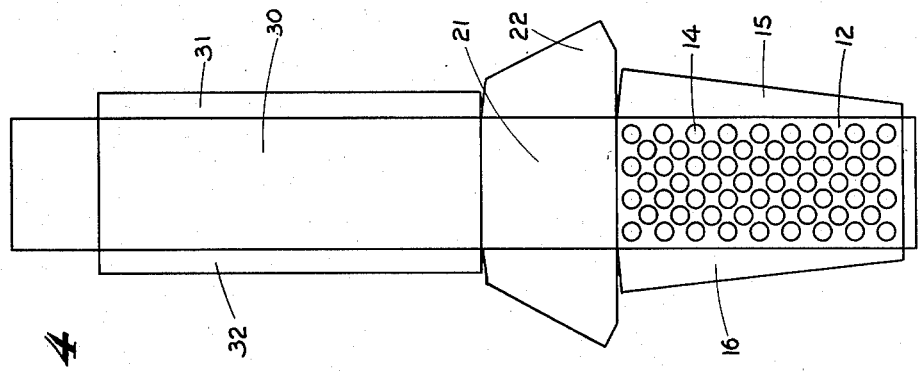
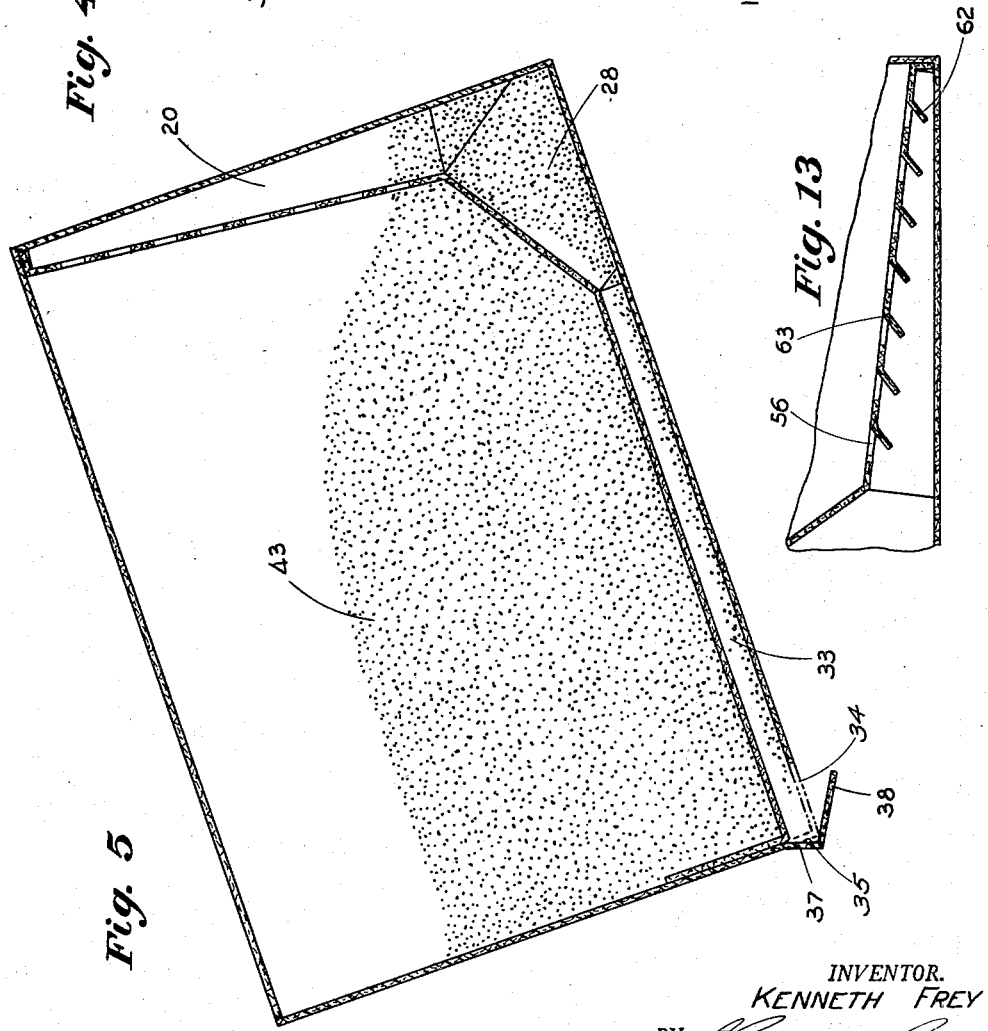
INVENTOR.
KENNETH FREY
BY
ATTORNEY Oct. 26, 1954 K. FREY 2,692,708
CARTON METERING INSERT FOR GRANULAR MATERIALS
Filed July 12, 1949 3 Sheets-Sheet 3
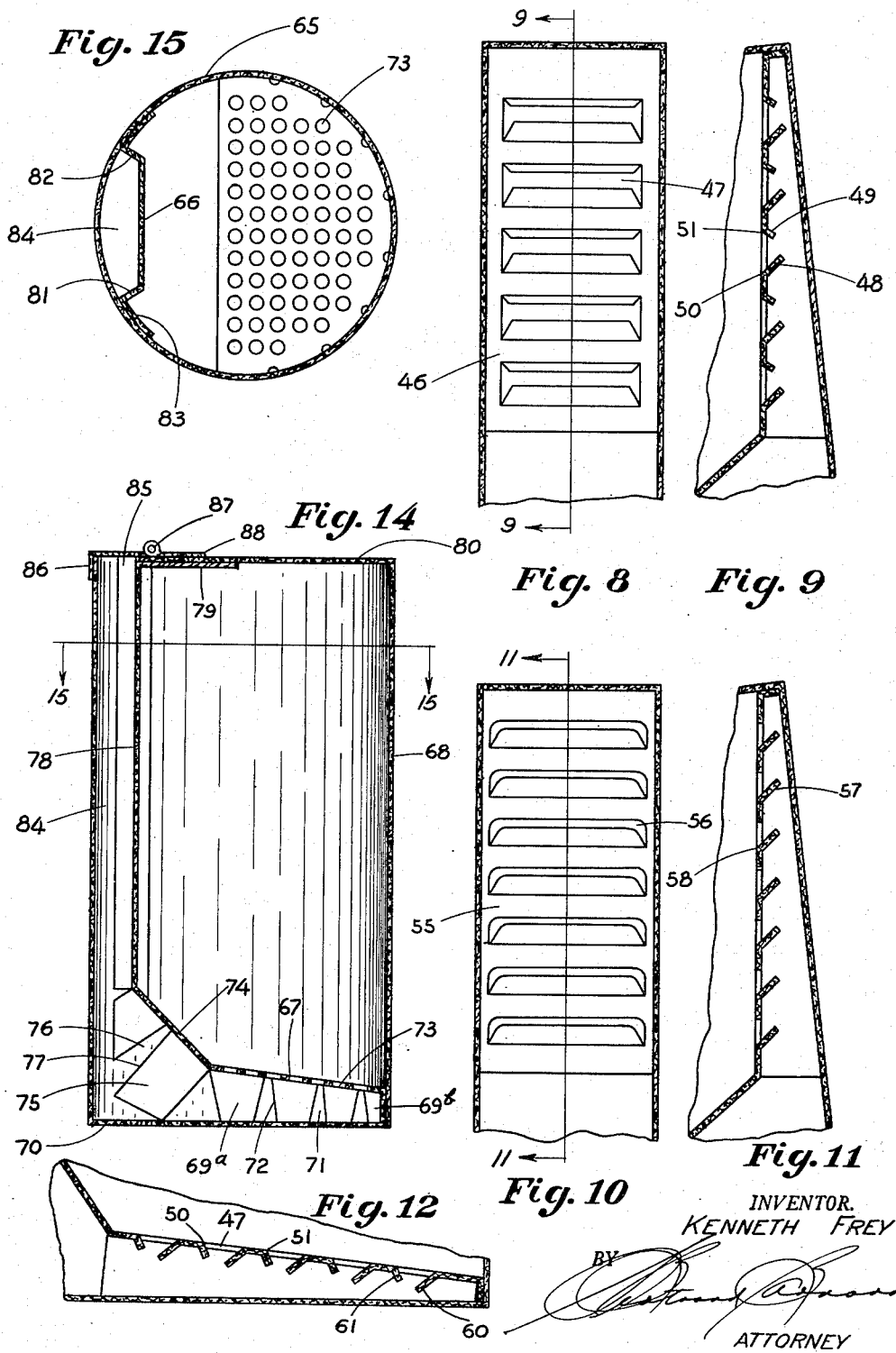
INVENTOR.
KENNETH FREY
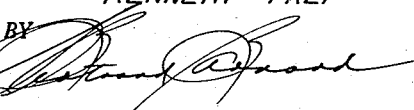
ATTORNEY Patented Oct. 26, 1954

2,692,708

UNITED STATES PATENT OFFICE 2,692,708

CARTON METERING INSERT FOR GRANULAR MATERIALS

Kenneth Frey, Brooklyn, N. Y.

Application July 12, 1949, Serial No. 104,321

4 Claims. (Cl. 222—456)

This invention relates to a metering insert for use in cartons, or other packages containing granular materials such as granulated soaps, to enable the user to pour out of the container a uniform, predetermined measured quantity of the material at each pouring operation.

While metering containers, and inserts therefor have been available, they have been relatively costly to produce and fit to the container, and have not been uniform in either metering or operation.

The object of this invention is to provide a one-piece insert, made of cardboard, paper-board, a plastic material or similar material, which may be inserted in a carton or container before it is filled, to enable a predetermined quantity of the material in the container to be poured out, each time the container is tilted to the pouring position.

A further object is to provide an insert which may be inserted in the container without altering the construction of the conventional container, or interfering with the filling thereof.

Another object is to provide an insert which will dispense a predetermined, uniform quantity of the material at each tilting.

A primary object is to provide an insert which will retain its shape, support the material in the container without buckling, and which is so constructed that only the desired quantity of material passes through the metering compartment at each application.

Another object is to provide an insert in which an intermediate compartment is provided to restrain the flow of additional material from the body of the container into the metering compartment, when the container is tilted.

A further object is to provide an insert, in which the measured quantity can be readily altered before the insert is fitted to the container.

The accompanying drawings, illustrative of one embodiment and several modifications of my invention, together with the description of their construction and the method of utilization thereof, will serve to clarify further objects and advantages of the invention.

In the drawings:

Fig. 1 represents a vertical section through a container of rectangular cross-section, showing the insert in place.

Fig. 2 is a side elevation of the container of Fig. 1 with one end removed to show the metering insert in place.

Fig. 3 is a partial section through the container, and a plan view of the top of the metering compartment.

Fig. 4 represents a development of the metering insert shown in Fig. 1.

Fig. 5 is a vertical section through the filled container of Fig. 1 tilted into the pouring position, showing the position of the material with relation to the insert.

Fig. 6 is a vertical section through the bottom of the container and the metering compartment, taken at 6—6, Fig. 1.

Fig. 7 is a section through one side of the container, and the pouring channel section of the insert.

Fig. 8 is a plan view of a modification of the top of the metering compartment, similar to Fig. 3, showing a set of louvres, in place of the openings of Figs. 1 and 3.

Fig. 9 is a section thru the louvres of Fig. 8, taken at 9—9, Fig. 8.

Fig. 10 is a plan view of another modification of the louvres at the top of the metering compartment, similar to Fig. 8.

Fig. 11 is a section through the louvres of Fig. 10, taken at 11—11, Fig. 10.

Fig. 12 is a section thru another modification of the louvres in the top of the metering compartment, similar to Fig. 9.

Fig. 13 is a section through another modification of the louvres in the top of the metering compartment, similar to Fig. 11.

Fig. 14 represents a vertical section through a container of circular cross-section, fitted with another embodiment of the metering insert.

Fig. 15 is a cross-section through the container and metering insert of Fig. 14, taken at 15—15, Fig. 14.

It will be understood that the following description of the construction and method of utilization of the carton metering insert for granular materials, is intended as explanatory of the invention and not restrictive thereof.

In the drawings, the same reference numerals designate the same parts throughout the various views, except where otherwise indicated.

One embodiment of the metering insert 10, as indicated in Figs. 1 and 2, is mounted in a container or carton 11, of rectangular cross-section, as used for granulated soaps or similar granular materials.

The insert, as indicated in Fig. 4, may be cut out of a single strip of cardboard, or a similar material, and folded along the lines indicated, to form the insert fitted to the container of Fig. 1. The insert is inserted in the container either at the time of manufacture of the container, or prior to the filling thereof, the insert forming a permanent part of the container.

The insert, as fitted to the container, comprises a sloping lower section 12, having a plurality of openings 14 formed therethru, with a pair of substantially parallel side flanges 15 and 16, fitted to the front and rear walls 17 and 18 of the container, the lower edge 19 of the flanges being tapered to form a metering compartment 20, between the insert section and the bottom of the container, when the insert is mounted in the container.

An angular intermediate section 21, of the insert, formed integral with the lower section, is also fitted with two shaped integral side flanges 22, the outer edges 24 and 25, of which, fit the inner edges of the corner of the bottom wall 26, and the side wall 27, of the container, when mounted as indicated in Fig. 1, thus forming an intermediate compartment 28 as indicated in Figs. 1 and 5.

The vertical section 30 of the insert, which is also formed integral with the angular section, is located substantially parallel to one side wall 27, of the container, the two side flanges 31 and 32, formed integral with the vertical section, abutting the inner edges of the front and rear walls of the container, to form a vertical channel or passage 33 of substantially rectangular cross-section, as indicated in Figs. 1 and 7, in communication with the intermediate compartment, leading from the intermediate compartment to an outlet opening 34, formed in the side wall, and the adjacent opening 35, formed in the upper wall 36, of the container, as indicated in Fig. 1.

In the closed position, the openings 34 and 35, may be covered by a pair of integral flaps 37 and 38, the upper flap 37, being formed integral with the upper wall 36, of the container, and angularly moved to the open position shown in the dot-dash lines, Fig. 1, along the perforated or creased line 39, near the side wall, with the side flap 38, formed integral with the upper flap, and normally substantially perpendicular thereto, moved out of alignment with the side wall, thus exposing the openings 34 and 35 in the side wall and top, respectively.

When the flaps 37 and 38 are manually moved to the open position, shown in Fig. 5, the material passing thru the channel may be discharged through the openings 34 and 35, when the container is tilted to the position, shown in Fig. 5.

The upper wall opening 35 may be eliminated entirely, thus eliminating the upper flap 37, all the material in the metering compartment being discharged through the opening 34 formed in the upper edge of the side wall 27, of the container.

A flap 42, formed integral with the upper end of the vertical section 30 of the insert, may be attached to the inner side of the upper wall 36 of the container, by gluing, or other suitable means, thus separating the channel of the insert from the body of the container, and sealing the material in the body of the container from the outlet openings 34 and 35, thereby preventing the discharge of additional material, other than that originally contained in the metering compartment 20, when the container is tilted to the discharge position, shown in Fig. 5.

When the container is held in the vertical position, shown in Fig. 1, a measured portion of the granulated soap, 43, or other contents of the container falls through the openings 14 in the sloping lower section of the insert, thus filling the metering compartment 20, at the bottom.

The capacity of the metering compartment 20 may be increased or decreased, by altering the height of the side flanges 15 and 16, of the lower section, or changing the angle of the slope of the lower edge 19 of the flanges.

When the container is tilted toward the left-hand wall 27, the granular material in the metering compartment 20, passes into the intermediate compartment 28, the material in the body of the container, sliding along the upper edge of the lower section, so that no appreciable amount of additional material is added to the metering compartment during the tilting process.

Upon further tilting to the position shown in Fig. 5, the material in the intermediate compartment 28, and the residue in the metering compartment, pass through the channel or passage 33, adjoining the left-hand side wall of the container, thence out through the openings 34 and 35 formed in the upper corner of the left-hand side wall and the upper wall 36, of the container, the flaps 37 and 38 being moved to the open position, shown in Fig. 5, before the tilting is started.

In order to refill the metering compartment at the bottom of the container, the container after the contents of the compartment 20 have been emptied, may be restored to the vertical position, shown in Fig. 1, the metering compartment being filled in the manner thereinbefore described, after which the container is again tilted to the position shown in Fig. 5, thus discharging the contents of the metering compartment through the intermediate compartment, and the discharge channel 33, in the same manner, the process being repeated until all of the granulated soap or other contents of the container, is discharged.

The amount of material deposited in the metering compartment is substantially uniform at each filling and discharge operation, due to the position of the sloping lower section 12, of the insert and the size of the openings therein.

After repeated tilting discharge operations, all of the material in the body of the container is discharged, the sharp slope of the intermediate section 21, causing any residue in the body of the container to fall through the openings in the lower section from which it is discharged through the outlet openings 34 and 35.

The intermediate compartment 28 in the lower left-hand corner of the container into which the material from the metering compartment is discharged, coupled with the sharp slope of the intermediate section, which is closed at the top, prevents the passage of any appreciable quantity of granulated material through the openings in the lower section, beyond the junction line 45, between the lower and intermediate sections of the insert, thus assuring a uniform quantity of material, during each discharge operation.

Figs. 8 and 9 show a modification of the lower section 46 of the insert, shown in Figs. 1 and 3, fitted with a series of substantially rectangular openings or louvres 47, in place of the circular or other form of openings, shown in Fig. 3.

As indicated in Fig. 9, a sloping guide 48 may be formed integral with the lower section 46 of the insert, with another guard 49, formed integral with the insert, at the opposite side of each opening 47, the material forming the guides and guard being cut out of the insert section as indicated in Fig. 8, and bent along the junction edges 50 and 51 to the relative angular positions shown in Fig. 9.

The size of the openings 47, the relative angles of the guides and guards to the insert section, and the relative length of the guide and guard may be varied to suit the type and size of the container, the particle size of the granulated material, and the size and proportions of the metering compartment, formed below the lower section.

The guides and guards are positioned in such a manner as to restrict the flow of material through the louvres, when the container is tilted to the discharge position shown in Fig. 5, and also to prevent the return flow of the material in the metering compartment 20 into the body of the container, during the tilting process.

Figs. 10 and 11 show another modification of the lower section 55 of the insert, shown in Fig. 8, fitted with a similar series of louvres or substantially rectangular openings 56.

Only one angular guide 57, is formed in each opening, as indicated in Fig. 11, the guide being cut out of each opening, and sloped downward through an angle from the lower section of the insert, toward the bottom of the container. The guides 57 are formed integral with the lower section of the insert and bent downward, at the line of intersection 58, between the guide and the insert section, at each opening.

The edges of the guide may be formed integral with the material of the insert section at the sides of the openings, the material at the ends of the guide being bent to form an angular support for each of the guides, to retain the guides in their angular position, against the head of the granular material in the container.

The number and size of the openings 56, and the angular position of the guides 57 with relation to the insert section, as well as the length of the guides, from the point of attachment to the outer edge may be varied to suit the size of the container, and the angular position of the insert section, in order to permit the flow of material into the metering compartment, when the container is in the vertical position.

Fig. 12 shows another modification of the lower section of the insert, similar to that shown in Fig. 9. The guides 60 and guards 61, cut out of the insert material, to form the openings or louvres 47, are similar to those shown in Fig. 9, except that they are respectively sloped in a direction, opposite those shown in Fig. 9. The size and location of the louvres 47, are substantially the same as those shown in Fig. 8.

Both the guide 60 and the guard 61, are cut out of the insert section, and bent along the junction edges 50 and 51 to the angular positions, shown in Fig. 12.

The angles between the guide 60, and the guard 61, with relation to the lower section of the insert are substantially the same as those shown in Fig. 9, and herebefore described.

Fig. 13 is a section through another modification of the lower section of the insert, similar to that shown in Fig. 11. The louvres 56 are substantially the same as those shown in Fig. 10.

The angular guides 62 in Fig. 13 are substantially the same as the angular guides 57 shown in Figs. 10 and 11, except that the guides 62 are formed and bent at the edge 63 of the openings 56, opposite to the edge at which the guides 57 are formed and bent, as shown in Fig. 11, the guides being sloped downward from the junction edge 63 of the opening toward the bottom of the container. The angle formed between the guide and the lower insert section is substantially the same as that of the guides of Fig. 11.

In all other respects, the insert section, the openings 56, and the guides 62, are substantially the same as those shown in Figs. 10 and 11, and hereinbefore described.

Figs. 14 and 15 show a container 65, of substantially circular cross-section, fitted with another embodiment of the metering insert 66.

The insert may be cut out of a single strip of cardboard, a plastic material or another suitable type of sheet material, and formed to the shape shown in Figs. 14 and 15, or it may be built up of several sections, the sections being joined to one another by gluing, heat sealing or other suitable means.

The insert, as indicated in Fig. 14, comprises a sloping lower section 67 in the form of a circular segment to fit the inner contour of the wall 68 of the container, with a plurality of tabs 69, cut out of the outer rim of the lower section, and bent to the position indicated in Fig. 14, the lower edge of each of the tabs abutting the bottom wall 70, of the container. The tabs are of graduated height, the central tabs 69a, being longer than the end tabs 69b, to form the sloping wall of the insert section, as indicated in Fig. 14, thus forming a metering compartment 71, at the bottom of the container, similar to that shown in Fig. 1. The sides 72, of each of the tabs may be tapered from the upper edge to the bottom to avoid interference, when the tabs are bent to conform to the substantially circular container wall contour.

A plurality of circular or other form of openings 73 may be formed in the upper wall of the lower section of the insert, in the manner shown in Fig. 3, or a series of louvres may be formed in the upper wall of the insert section, similar to those shown in Figs. 8 and 10. A set of guides and guards similar to those shown in Figs. 9 and 12, may be formed integral with the lower section of the insert, adjacent the louvres, or individual guides may be formed at each louvre, in the manner shown in Figs. 11 and 13, in place of the openings 73.

An angular intermediate section 74 of the insert, may be formed integral with the lower section, the outer edge of the section being semi-elliptical in contour to conform to the contour of the container wall.

A plurality of tabs 75, may be formed at the outer edge of the intermediate section, the tabs being bent substantially perpendicularly to the intermediate section and shaped to the contour of the container wall. The tabs may be attached to the container wall by gluing or other suitable means, or the elasticity of the material of the insert, in the arcuate form may be relied upon to press the tabs against the container wall. An intermediate compartment 76, in communication with the metering compartment is formed at the junction between the container wall and the base, under the intermediate section 74 of the insert.

The sides 77 of the tabs may be sloped as indicated in Fig. 14, to permit arcuate bending of the tabs to the contour of the container wall.

The vertical section 78 of the insert, formed integral with the angular section, may extend upward, in a direction substantially perpendicular to the container base from the intersection with the intermediate section, a flap 79, formed integral with the upper edge of the vertical section, being attached to the cover 80 of the container, by gluing or other suitable means to support the vertical section of the insert.

The edges of the vertical section may be sloped outward to form channel side walls 81 and 82, as indicated in Fig. 15, a pair of flanges 83 being formed integral with the side walls 81 and 82, at the junction with the inner wall of the container, the flanges being bent to conform to the substantially circular cross-section of the container wall. The flanges may be attached to the inner wall of the container by gluing, or other suitable means, thus forming a vertical channel or passage 84, leading from the intermediate compartment, at the bottom of the container, to the outlet opening 85, formed in the upper wall of the container.

A cap 86, formed of sheet metal, a plastic material, or other suitable material, may be utilized to cover the opening formed in the upper wall of the container, as indicated in Fig. 14. The cap may be hinged by means of a hinge pin 87, to a flange 88, attached to the upper wall of the container, or other suitable means of opening the cap, and supporting it on the container may be provided.

The operation of the metering insert, shown in Figs. 14 and 15, is substantially the same as that of the insert in the container, shown in Figs. 1 and 5, and hereinbefore described.

When the container 65 is in the vertical position, shown in Fig. 14, a portion of the granular material, contained in the body of the container passes through the openings 73, formed in the lower section 67 of the insert, thus filling the metering compartment 71, at the bottom of the container.

When the container is tilted to a position corresponding to that shown in Fig. 5, the material in the metering compartment passes through the adjoining intermediate compartment 76, thence through the vertical channel or passage 84, and out through the opening 85, formed in the top of the container, after the cap is moved from the closed position shown in Fig. 14, to the open position, by pivoting about the hinge pin 87, thus clearing the opening 85 and permitting the material to pass through it.

At each repeated tilting, substantially the same amount of material deposited in the metering compartment, is discharged through the channel 84 and the opening 85, thus providing uniform measured batches of the material for the purpose required.

The container shown in Fig. 1, may be of rectangular, square or other suitable cross-section, depending upon the amount of material contained therein, and the desired appearance.

The insert may be made of a sheet of cardboard, a plastic material, or other suitable form of sheet material, depending upon the size of the container, the amount of material to be discharged at each tilting, and the rate of discharge.

The metering inserts shown in Figs. 1 and 3 may be mounted in a container, or built into a special metal or plastic container, for household use, into which the material from a conventional type of container is discharged, in bulk.

The height of the metering compartment may be varied depending upon the amount of material to be discharged from the container in each batch.

The angular position of the intermediate compartment may be varied to suit the requirements of the container shape, and the size and angle of the adjacent metering section, the volume of the intermediate compartment being equal to, or slightly greater, or less than that of the metering compartment.

The size and shape of the vertical channel, would depend upon the size and shape of the container, the size, shape and position of the discharge opening at the top of the container, and the rate of discharge of each batch of material in the metering compartment, which is desired.

In place of the openings, shown in the lower section of the insert in Fig. 3, openings of square, rectangular or other suitable form may be substituted, depending upon the size of the container, and the size of the particles of the material contained therein.

The louvres shown in Figs. 8 and 10, may run continuously over a major portion of the width of the insert, or a series of openings may be formed in sections, with a gap between adjacent sections, depending upon the width of the insert, and the weight of the material in the container.

The angle of the guides shown in Figs. 11 and 13, and the guides and guards shown in Figs. 9 and 12, may be varied considerably depending upon the size of the container, the size of the openings, and the size of the material particles, for which the container is used.

The edges of the guides and guards may be formed integral with the insert section, at the sides of the openings, to stiffen the guides and guards, and to support the bulk of the material above the insert section.

The lower section of the insert may be molded or stamped of a plastic or other suitable sheet material, particularly in circular, or odd-shaped container sections, to form the louvres, guides and guards, the lower section being attached to the rest of the insert by gluing or other suitable attaching means.

It will be apparent to those skilled in the art that my present invention is not limited to the specific details described above and shown in the drawings, and that various further modifications are possible in carrying out the invention without departing from the spirit and scope of the appended claims.

What I claim is:

1. A one-piece metering insert, made of a paper composition, said insert being fitted to a container, having front, rear, side, top, and bottom walls, the junction between one side wall and the top wall having a dispensing outlet therethrough, comprising a metering section angularly located relative to the container bottom wall, said metering section having a plurality of openings formed therein, a pair of substantially parallel flanges formed integral with said metering section, the metering section and flanges forming a metering compartment between the front, rear, one side wall and the bottom container wall, an intermediate section formed integral with said metering section, said intermediate section having a pair of flanges formed integral therewith, means locating said intermediate section relative to the bottom and one side wall of the container, a channel section of said insert paralleling the container side wall having the dispensing outlet therein, said channel section having a pair of flanges integral therewith, said channel section flanges, and the adjacent container side wall forming a channel passage in communication with the dispensing outlet, and means spacedly supporting said insert sections relative to the bottom, front, rear and side container walls, said insert being constructed independently of the container walls.

2. A one-piece metering insert, made of a paper composition, said insert being fitted to a container having front, rear, side, bottom and top walls, the junction between one side wall and the top wall of the container having a dispensing outlet formed therein, said insert comprising a metering section, angularly positioned with relation to the bottom wall of the container, said metering section having a plurality of openings therethrough, a pair of substantially parallel flanges formed integral with said metering section, said flanges abutting the bottom container wall to form a metering compartment between the front and rear walls and one side wall of the container, an intermediate section integral with the metering section and angularly disposed thereto, means locating said intermediate section relative to the bottom wall and the side wall of the container, having the dispensing outlet therethrough, said intermediate section forming an intermediate compartment in communication with the metering compartment, between the front and rear walls, the adjacent side wall of the container, and said intermediate section, a channel section paralleling one side wall of the container, said channel section having a pair of substantially parallel flanges integral therewith, a flap integral with one end of said channel section, said flap being attached to the top wall of the container, said channel section forming a channel passage along the container side wall, fitted with the dispensing outlet, the channel passage connecting the intermediate section with the dispensing outlet, said insert being constructed independently of the container walls, the material in the metering compartment flowing into the intermediate compartment, thence through the channel and out through the dispensing outlet, when the container is successively tilted.

3. A one-piece metering insert, made of a paper composition, said insert being fitted to a container having front, rear, side, bottom and top walls, the junction between one side wall and the top wall of the container having a dispensing outlet formed therein, comprising a metering section having a plurality of openings formed therethrough, a pair of substantially parallel flanges formed integral with said metering section, said flanges angularly locating said metering section relative to the bottom container wall, an intermediate section angularly disposed to said metering section, formed integral with said metering section, said intermediate section having a pair of substantially parallel flanges integral therewith, said metering section forming a metering compartment between the front and rear, bottom, one side container wall, and the metering section, the intermediate section forming an intermediate compartment between the front and rear wall, the side wall having the dispensing outlet therethrough, the bottom wall and the intermediate section, the intermediate compartment being in direct communication with the metering compartment, a channel section paralleling one side wall of the container formed integral with the intermediate section, a pair of flanges formed integral with said channel section, said channel section, the flanges integral therewith, and the adjacent container side wall forming a channel passage in communication with the dispensing outlet, along the container side wall, and a flap formed integral with one end of said channel section, attached to the top container wall, said channel section sealing the interior of the container body from the dispensing outlet, said insert sections being constructed independently of the walls of the container.

4. In combination with a container having front and rear, side, top and bottom walls, the side walls connecting the front and rear walls, the junction between one side wall and the top wall of said container having a dispensing outlet formed therein, a one-piece metering insert comprising a metering section having a plurality of openings therethrough, said metering section extending from one side wall of the container to a point a short distance from the opposite side wall, means locating said metering section relative to the bottom wall of the container, said metering section forming a metering compartment between the front and rear walls, the bottom wall, one side wall of the container, and the metering section, an intermediate section formed between the front and rear container walls, the bottom wall and the side wall having a dispensing outlet therethrough, the intermediate section of the insert forming an intermediate compartment between the metering section and the side wall of the container, having a dispensing outlet therethrough, another section of said insert forming a channel adjoining the side wall of the container having a dispensing outlet therethrough, said channel connecting the intermediate compartment with the dispensing outlet, and means for supporting the metering insert in spaced relation to the container top wall and the container side wall forming part of the channel, said metering insert being constructed independently of the walls of the container.

References Cited in the file of this patent

UNITED STATES PATENTS

| Number | Name | Date |
| --- | --- | --- |
| 957,005 | Sherman | May 3, 1910 |
| 1,216,640 | Williamson | Feb. 20, 1917 |
| 1,261,072 | Uyehara | Apr. 2, 1918 |
| 1,498,491 | Stinson et al. | June 17, 1924 |
| 1,967,687 | Rice | July 24, 1934 |
| 2,022,031 | Fisher | Nov. 26, 1935 |
| 2,092,983 | Milward | Sept. 14, 1937 |
| 2,335,363 | Shelton | Nov. 30, 1943 |

FOREIGN PATENTS

| Number | Country | Date |
| --- | --- | --- |
| 775,540 | France | Oct. 15, 1934 |